Patented Aug. 31, 1948

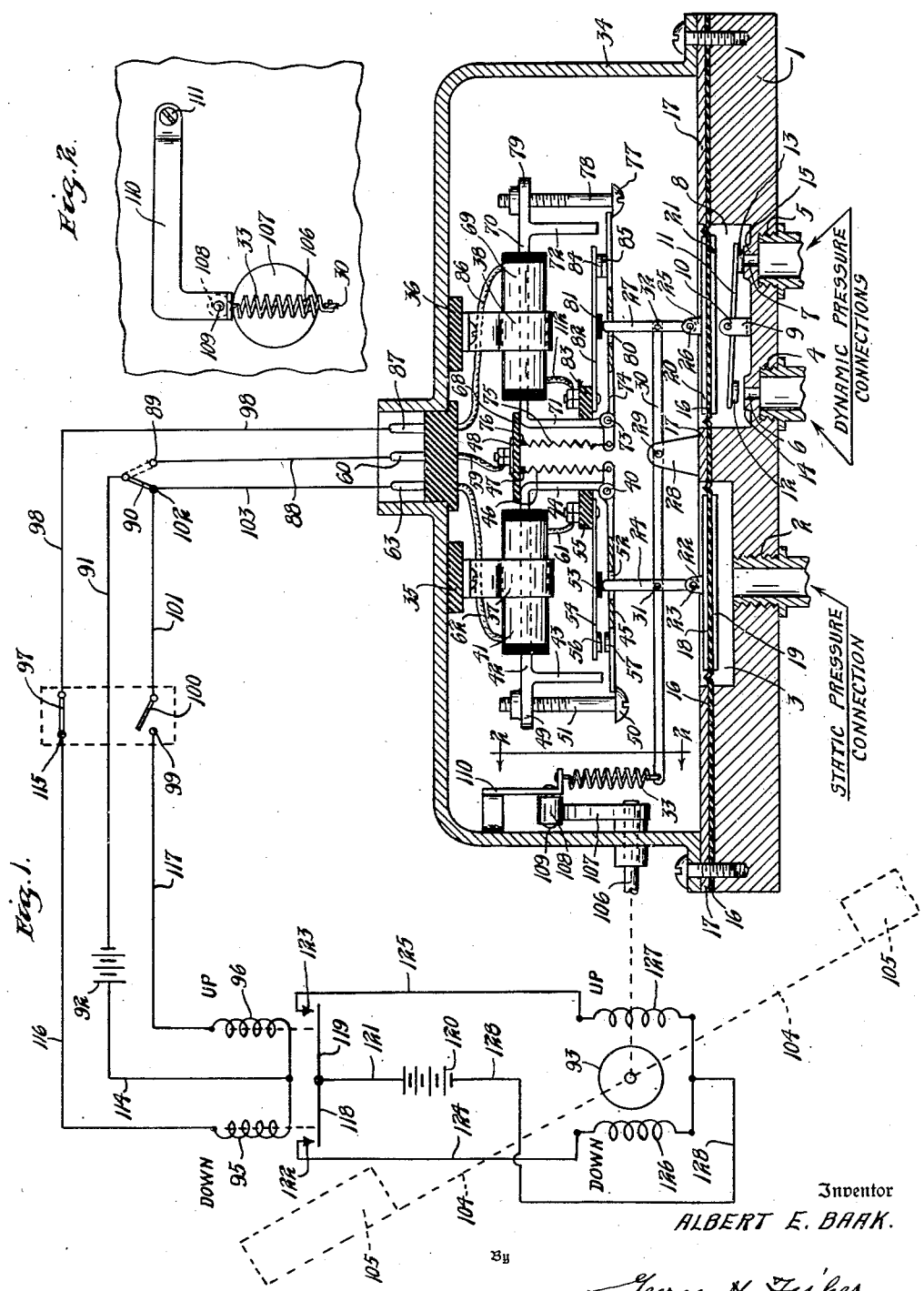

2,448,167

UNITED STATES PATENT OFFICE 2,448,167

FLAP CONTROL DEVICE RESPONSIVE TO AIR SPEED

Albert E. Baak, Los Angeles, Calif., assignor to Minneapolis-Honeywell Regulator Company, Minneapolis, Minn., a corporation of Delaware Application December 12, 1942, Serial No. 468,841

16 Claims. (Cl. 244—42)

My present invention relates to new and novel control devices for aircraft, and more particularly to automatic airspeed responsive control mechanism for controlling the position of the landing flap of an aircraft so as to increase or decrease the maximum angle of adjustment of the landing flap in response to air speed conditions.

As is well known in the art, if the landing flaps of a plane be adjusted with respect to the air flow at too great an angle for the speed at which the plane is traveling, it is quite possible that the strain or pressure of the flow of air on the flaps may be so great as to cause their destruction, although at a lesser rate of travel of the plane such adjustment may be quite safe and indeed desirable.

It is therefore an object of my invention to provide automatic safety means for limiting the adjustment of such flaps dependent upon the speed at which the plane is traveling and thereby preventing the excessive adjustment of such flaps which might otherwise cause the destruction of the wing or flaps and the occupants of the plane.

Another object of my invention is to provide a novel air speed responsive means for controlling the limits of adjustment of the landing flaps of a plane.

Another object of my invention is to provide a pivoted lever operatively connected at opposite sides of its pivotal point to a pair of pressure responsive diaphragms actuated by static and dynamic pressure, respectively, in such a manner as to differentially actuate said lever, an adjustable spring biasing means connected at one end of the lever and switch members actuated by the lever for controlling a motor means for adjustably positioning the flaps of a plane and regulating the biasing force exerted by the adjustable spring biasing means upon the pivoted lever.

Another object of my invention is to provide a pair of separate control switches operatively connected to a pair of pressure responsive members, one of said members responsive to static pressure and the other of said members responsive to dynamic pressure arranged so as to alternatively actuate said control switches upon an increase or decrease in the difference between said pressures.

Another object of my invention is to provide magnetic means whereby a differential in the condition value at which the said control switches are opened and closed may be readily provided.

Another object of my invention is to provide spring means for biasing the switch operating pressure responsive members in opposite directions and reversible motor means controlled by the switches for varying the tension exerted by said spring means in such manner that the spring tension is increased or decreased dependent upon the difference in pressure exerted upon the pressure responsive members.

Other objects and advantages of this invention are set forth in the following description, taken with the accompanying drawings, and the novel features thereof are pointed out in the appended claims. The disclosure, however, is illustrative only and I may make changes in details, especially in matters of shape, size and arrangements of parts within the principles of the invention, to the full extent indicated by the broad and general meaning of the terms in which the appended claims are expressed.

In the accompanying drawings, wherein like reference characters indicate corresponding parts of the various figures, Figure 1 is a schematic diagram of a circuit used with one form of my control mechanism, which control mechanism is shown in section, and Figure 2 is a sectional view taken along the line 2—2 of Figure 1.

In Figure 1, I have illustrated one form of my control mechanism which is particularly adapted for use as an automatic landing flap control switch, although it will be apparent that the same is readily adaptable for a wide range of uses as a differential pressure actuated control switch, particularly in connection with aircraft.

Referring now to the drawing of Figure 1, a base member 1 is provided having a screw-threaded opening 2 leading to an annular recess 3 providing a pressure chamber. The opening 2 is adapted for connecting the interior of the pressure chamber 3 to a source of static pressure by means of a suitable pipe leading to the static pressure connection of a standard Pitot tube.

There is further provided in the base member 1 screw-threaded openings 4 and 5 which are connected by the channels 6 and 7, respectively, to an annular recess 8 forming a second pressure chamber. The openings 4 and 5 are adapted for connection to separate sources of dynamic pressure by means of suitable connecting pipes leading to the dynamic pressure connections of a standard Pitot tube. A supporting arm 9 projects from the bottom of the recess 3 and has pivotally connected thereto by a pin 10 a selector valve arm 11. At opposite ends of the selector valve arm 11 are provided valve members 12 and 13 adapted to cooperate with seat portions 14 and 15 so as to close the openings of channels 6 or 7, respectively, leading into the pressure chamber 8 upon the dynamic pressure at one of said channels being sufficiently great so as to pivot the selector arm 11 in such a manner as to close the openings of the opposite or other channel providing lesser pressure. Thus, the pressure afforded the chamber 8 will be the greater of the two. The provision of the two dynamic pressure inlets 4 and 5 is an added safety feature which lessens the chances of inaccurate operation of the device upon destruction of one or the other of the dynamic pressure tubes during combat and are not necessary to the fundamental operation of the apparatus of the present invention.

A diaphragm 16 is supported between the upper portion of the base member 1 and a diaphragm supporting member 17. The diaphragm 16 extends across the upper opening of the recesses 3 and 8 and seals at the upper end the pressure chambers 3 and 8 provided by such recesses. Diaphragm disk plates 18 and 19 are mounted at opposite sides of the portion of the diaphragm 16 exposed to the static pressure provided in the chamber 3 while diaphragm disk plates 20 and 21 are mounted on opposite sides of the portion of the diaphragm 16 exposed to the dynamic pressure provided within the pressure chamber 8. Thus it will be seen that the diaphragm disk plates 18 and 19 will be forced upwardly in response to the static pressure within the pressure chamber 3 while the diaphragm disk plates 20 and 21 will be forced upwardly in response to the dynamic pressure within the pressure chamber 8.

Affixed to the disk 18 and projecting vertically therefrom is a stud 22 to which there is pivotally connected by a pin 23 a push rod 24. A stud 25 is similarly attached to the disk plate 20 and projects vertically upwardly. The stud 25 has pivotally connected thereto by a pin 26 a push rod 27. The diaphragm supporting member 17 has mounted thereon a vertically projecting arm 28. The arm 28 has pivotally connected thereto by a pin 29 a lever 30 which interconnects the push rods 24 and 27 by the pivot pins 31 and 32. One end of the lever 30 is connected to an end of an expansion spring 33. The opposite end of the expansion spring 33 may be adjustably positioned so as to vary the tension thereon in a manner which will be explained.

A casing 34 surrounds the operating switch mechanism and is mounted on the diaphragm supporting member 17 in any suitable manner. Mounted on the upper inner surface of the casing 34 are downwardly projecting lugs 35 and 36 to which electromagnetic coils 41 and 69 are fastened by straps 37 and 38. The coil 41 has positioned therein a U-shaped core 42 having provided leg portions 43 and 44. Pivotally connected to the lower end of the leg 44 by a pin 40 is a switch arm 45. At one end of the switch arm 45 is connected a tension spring 46. The upper end of the tension spring 46 is fastened to a lug 47 mounted on an electrical conducting plate 48 positioned on a supporting insulation member 68 fastened to the casing 34.

The switch arm 45 is thus pivoted under tension of the spring 46 for rotation in a counterclockwise direction. The counter-clockwise movement of the switch arm 45 is limited by the projecting edge of the head 50 of an adjustment screw 51 formed of suitable non-magnetic material whereby the position of the switch arm 45 in response to tension of the spring 46 may be adjustably positioned. The adjustment screw 51 is screw-threadedly engaged in an arm 49 projecting from the leg 43 of the magnetic core 42. An aperture 52 is provided in the switch arm 45 through which there projects the push rod 24 for engagement with the seat portion 53 formed of suitable insulation material and suitably attached to a spring blade switch arm 54. The spring blade switch arm 54 is attached to an insulation member 55 which is in turn fastened to the leg 44 of the core 42. The biasing force of the spring blade 54 moves said switch blade 54 in a counterclockwise direction and in engaging relation with the push rod 24. A contact member 56 is positioned at the free end of the spring blade 54 for cooperation with a second contact 57 mounted in a corresponding position on the switch arm 45. It will thus be seen that upon downward movement of the push rod 24, the contact 56 may come into engaging relation with the contact 57 and thus close a circuit controlled by the switch.

The top portion of casing 34 is provided with an opening having a terminal supporting member of insulating material therein. Such member supports three terminals 60, 63 and 87. An electrical conductor 59 leads from the terminal 60 to the plate 48 to which there is in turn electrically connected the spring 46 by which the circuit is connected to the switch blade 45. An electrical conductor 61 in turn connects the switch blade 54 to the electromagnetic coil 41, the opposite end of the coil 41 being connected to a conductor 62 leading to terminal 63.

From the foregoing, it will be readily seen that upon the closing of the contacts 56 and 57, an electrical circuit will be closed through electromagnet 41. Energization of electromagnet 41 will cause the end of the arm 43 of the core 42 to attract the switch blade or armature 45 formed of suitable electromagnetic material and thereby biasing the switch blade 45 in a clockwise direction, thus causing the movement of the arm 45 further into engagement with the switch blade 54 so that an additional movement of the switch arm 54 in a clockwise direction is required by the condition responsive means or push rod 24 in order to open the circuit. Thus by regulating the distance of movement of the arm 45 by the electromagnetic core 43, through adjustment of the screw 51, the differential between the condition value at which the switch contacts 56 and 57 are opened and closed may be readily determined.

The electromagnet 69 has similarly positioned therein an electromagnetic U-shaped core 70 having leg portions 71 and 72. Pivotally connected at the end of the leg 71 by a pin 73 is a switch blade 74 formed of suitable magnetic material. One end of the switch blade 74 is connected to an end of a tension spring 75 which spring has the opposite end thereof connected to a lug 76 mounted on the plate 48, which as previously explained is fastened to the insulation member 68 mounted on the casing 34. The spring 75 biases the switch blade 74 for rotation in clockwise direction. Clockwise movement of the switch blade 74 in response to the tension of spring 75 is limited by a screw head 77 of an adjustment screw 78 formed of suitable non-magnetic material and screw-threadedly engaged in an arm 79 projecting from the leg 72. Thus by adjustment of the screw 78, the position of the switch blade 74 under the tension of the spring 75 may be readily adjusted. An aperture 80 is formed in the switch arm 74 and push rod 27 projects through the aperture 80 to operably engage a seat portion 81 of insulation material mounted on spring blade switch member 82. The spring blade switch member 82 is attached at one end to an insulation member 83 which is in turn fastened in any suitable manner to the leg 71 of the electromagnetic core 70. A contact 84 is mounted at the opposite end of the switch blade 28 and the biasing force of the spring blade switch member 82 tends to move the contact 84 in a clockwise direction. A second contact 85 is mounted on the switch arm 74 for cooperation with the contact 84. Thus it will be readily seen that upon downward movement of the push rod 27 the spring blade switch arm 82 will move in its clockwise direction causing the contact 84 to engage the contact 85.

An electrical conductor 112 is connected at one end to the switch blade 82 and at the opposite end to one terminal of the electromagnet 69. An electrical conductor 86 leads from the opposite terminal of the electromagnet 69 to terminal 87. As is readily apparent, the terminal 60 is connected through the electrical conductor 59 to the plate 48 which is in turn electrically connected through the lug 76 and in turn through the spring 75 to the switch arm 74. Thus, it will be seen that upon connecting the terminals 60 and 87 to the opposite terminals of a suitable source of electrical current, the downward movement of the push rod 27 will cause the contacts 84 and 85 to close so as to in turn close an electrical circuit. Such action will cause the energization of electromagnet 69, which will in turn cause an end of the core leg 72 to attract the switch arm or armature 74 formed of suitable electromagnetic material and thereby cause the movement of the arm 74 further into engagement with the spring blade switch arm 82 so that an additional movement of the spring blade switch arm in an opposite or counter-clockwise direction by the push rod 27 will be necessary in order to open the circuit. Thus by regulating the distance of movement of the arm 74 by the electromagnet, the differential between the condition value at which the switch contacts 84 and 85 are opened and closed may be readily determined.

When utilized as an automatic control for the landing flap of an aircraft, it will be seen, as shown in Figure 1, that the terminal 60 is connected by an electrical conductor 88 to a switch contact 89 controlled by a switch member 90, which has the opposite end thereof connected through a conductor 91 to a suitable source of electrical current 92. The opposite terminal of the source of electrical current 92 is connected by the conductor 114 to opposite relay coils 95 and 96 which control the direction of rotation of a motor 93 as will be explained.

The relay coil 95 is connected by a conductor 116 to a switch terminal 115 controlled by a switch member 97 in a manner which will be explained. The switch member 97 is connected through an electrical conductor 98 to the terminal 87 previously described. The relay coil 96 is likewise connected by a conductor 117 to a switch contact 99 which is in turn controlled by a switch member 100 as will be explained. The switch member 100 is connected through an electrical conductor 101 to a switch contact 102 also controlled by the switch arm 90, as will be explained. The contact 102 is in turn connected through an electrical conductor 103 to terminal 63 previously described.

The relay coil 95 controls a resilient switch arm 118 while the relay coil 96 controls a resilient switch arm 119. A suitable source of electrical energy 120 has one terminal thereof connected by a conductor 121 to said switch arms 118 and 119. Upon energization of the relay coil 95 switch arm 118 is actuated so as to engage a contact 122, while upon energization of relay coil 96, switch arm 119 is actuated so as to engage a contact 123. Upon deenergization of relay coils 95 and 96, the respective resilient switch arms 118 and 119 controlled thereby, under the spring tension of said arms, move to an open position with regard to the respective contacts 122 and 123. Conductors 124 and 125 lead from the respective contacts 122 and 123 to oppositely disposed field windings 126 and 127 respectively of motor 93 which determine the direction of rotation of the motor 93 in a manner well known in the art. The opposite ends of the field coils 126 and 127 are connected by a conductor 128 to the other terminal of the source of electrical current 120.

The armature of the motor 93 drives suitable mechanical means indicated generally by the numeral 104 so as to adjust the landing flaps 105 in a direction dependent upon which of the field windings 126 or 127 is energized. Thus, upon energization of the field winding 126, the landing flap 105 is driven downwardly until the energizing circuit is broken by deenergization of the relay coil 95. This is accomplished by opening of the switch 97, which constitutes a well known limit switch that is opened at the maximum adjusted position of the landing flap 105 by suitable mechanical means driven by the motor 93. Of course, opening of the circuit of the relay coil 95 by the automatic control mechanism itself might occur before such limiting position is reached. Similarly, with the landing flaps in a downwardly position, the same will be driven by the armature of the motor 93 in an upwardly direction upon energization of the field winding 127. The relay circuit controlling the energization of the relay coil 96 may be broken upon the opening of the limit switch 100 mechanically controlled by suitable means through the motor 93 upon reaching the extreme upward position or upon the opening of the circuit by the automatic air speed responsive means in a manner which will be explained.

The armature of motor 93 is further suitably mechanically connected so as to drive a cam adjustment shaft 106. The cam adjustment shaft 106 projects through the casing 34 and has mounted at the opposite end thereof a cam member 107. Engaging the cam surface of the cam 107 is a roller member 108, rotatably mounted on a pin 109 fixed to an arm 110. The arm 110 is pivotally connected at the opposite end to a pin 111 affixed to the casing 34. At the other end of the arm 110 is connected the spring member 33 previously described for exerting an upward biasing force upon the lever arm 30. The surface of the cam 107 is so arranged with respect to the roller 108 that upon rotation of the armature 93 in a direction to deflect the flaps 105 downwardly, the tension of the spring 33 will be progressively decreased as the flaps 105 are directed in a downward direction, while upon the deflection of the flaps 105 upwardly, the tension of the spring 33 will be progressively increased.

From the foregoing, it will be seen that the spring 33 will exert a biasing force on the lever 30 which together with the force exerted on the lever by the push rod 24 under force of the static pressure within the chamber 3 acting upon the disk 19 will tend to pivot the lever 30 about the pivot point 29 in a clockwise direction tending to counteract the biasing force exerted on the push rod 27 by means of the dynamic pressure within the pressure chamber 8 acting upon the diaphragm disk 21. It will thus be seen that upon the biasing force exerted by the spring and push rod 24 being greater than that exerted by the dynamic pressure within the chamber 8 or the push rod 27, the switch contacts 84, 85 will tend to close while switch contacts 56, 57 will tend to open, while upon the dynamic pressure exerted within the pressure chamber 8 upon the push rod 27 being greater than that combined pressure of the spring 33 and push rod 24, the contacts 84 and 85 will tend to open and the switch contacts 56 and 57 will tend to close.

In the operation of the automatic control device it will be seen that with the landing flaps in the extreme upward position, downward movement of the said flaps may be initiated on adjustment of the switch 90 so as to close the circuit at the contact 89 as indicated by dotted lines in Figure 1, in which case unless the speed of travel of the aircraft be exceedingly excessive the tension exerted by the spring 33 will be sufficiently great together with the static pressure exerted on the switch rod 24 to have adjusted the lever 30 so as to force the push rod 27 downwardly causing the contacts 84 and 85 in engaging relation to close the relay circuit as shown on Figure 1. Current will then flow from the source of electrical current 92 through the conductor 91, switch 90, contact 89, conductor 88, terminal 60, conductor 59, plate 48, lug 76, spring 75, switch arm 74, contact 85, contact 84, switch blade 82, conductor 112, through the electromagnetic coil 69 to the conductor 86, terminal 87, conductor 98, switch 97, contact 115, conductor 116 through the relay coil 95 and returning to the source of electrical current 92 through the conductor 114, causing thereby the energization of the relay coil 95 and the actuation of switch arm 118 so as to engage contact 122. Upon such engagement of contact 122 current will then flow from the source of electrical energy 120 through conductor 121, switch arm 118, contact 122, conductor 124, field winding 126, and returning to the source of electrical energy 120 through conductor 128, causing energization of field winding 126 and rotation of the armature of the motor 93 so as to pivotally move the flaps 105 downwardly. Now if the speed of the plane be such that the flaps 105 may be adjusted downwardly the full angular amount without damage to the plane, the downward deflection of the flaps 105 will continue until the limit switch 97 is opened by the rotary movement of armature 93 causing in turn the opening of switch 118. However, if the speed of the plane be such that the full angular adjustment of the flaps 105 will cause potential damage to the plane, the dynamic pressure exerted upon the diaphragm disk 21 as a result of such speed and the partial adjustment of the landing flaps causing the tension of spring 33 to decrease upon rotation of the cam 107 by the armature 93 through the shaft 106, will cause push rod 27 to move upwardly actuating the seat member 81 causing the spring blade switch member 82 to move in a counter-clockwise direction breaking in turn the connection between the contacts 84 and 85. Such action will result in the opening of the circuit controlling the relay coil 95 and the electromagnetic coil 69, thereby causing the opening of switch 118 terminating the downward deflection of the flaps 105 and causing deenergization of the magnetic core 70 so as to release switch arm 74 to further open position under tension of spring 75. Now if the speed of the plane increases still further, the push rod 27 under the increased biasing force of the dynamic pressure exerted in the pressure chamber 8 upon the diaphragm plate 21, will cause the lever 30 to be pivoted in a counter-clockwise direction in a further amount causing thereby an additional downward movement of push rod 24 progressively releasing the seat portion 53 and permitting the spring blade switch member 54 to move under the biasing force thereof in a counter-clockwise direction so as to engage the contacts 56 and 57.

The closing of the contacts 56 and 57 will then cause current to flow from the source 92 through the conductor 91, switch 90, contact 89, conductor 88, terminal 60, conductor 59, plate 48, lug 47, spring 46, switch arm 45, contact 57, contact 56, switch arm 54, conductor 61, electromagnetic coil 41, conductor 62, terminal 63, electrical conductor 103, contact 102, conductor 101, switch 100, contact 99, conductor 117, through relay winding 96, and returning to the source of electrical current through the conductor 114. The energization of the relay coil 96 will thereupon cause the actuation of switch arm 119 so as to engage contact 123. Upon such engagement of contact 123 current will then flow from the source of electrical energy 120 through conductor 121, switch arm 119, contact 123, conductor 125, field winding 127, and returning to the source of electrical energy 120 through conductor 128, causing energization of field winding 127 and rotation of the armature of the motor 93 so as to pivotally move the flaps 105 upwardly. The cam 107 will be simultaneously moved so as to increase the tension of the spring 33 as previously described. The increase in the tension of the spring 33 will in turn cause an adjustment of the lever 30 in a clockwise direction to balance the dynamic force exerted upon the push rod 27 and tending to force the push rod 24 upwardly. However, since upon closing the contacts 56 and 57 the electromagnetic coil 41 was energized causing the attraction of the switch arm 45 by the end of the leg 43 of the core 42, the push rod 24 must adjust to a greater upward position than that at which the contacts 56 and 57 were closed before the contacts 56 and 57 will be opened. The differential between the opening and closing of contacts 56 and 57 and 84, 85 may be suitably adjusted by the adjustments of the screws 51 and 78, respectively. Thus, by adjusting the position of the switch arms 45 and 74 with respect to the cores 43 and 72, respectively, the operating range within which the respective switch members will open and close may be conveniently adjusted. Further, with the landing flaps 105 in a downward adjusted position, the same may be readily raised to the upward position by adjustment of the switch 90 so as to close the contact 102, thus cutting out of operation the electromagnet 69 and relay coil 95 and energizing the relay coil 96 closing switch 119. This will cause the armature 93 to move the landing flaps 105 in an upwardly direction until the limit switch 100 is opened upon the landing flaps reaching the extreme upward position. This deenergizes the field winding 96 and terminates rotary movement of armature 93.

From the foregoing, it will be seen that the landing flaps 105 may be maintained in a full upward position at all times as desired by the pilot, for example as during normal flight, by positioning the switch arm 90 so as to engage contact 102 as shown in full lines in Fig. 1. However, when the pilot desires that the landing flaps 105 be positioned in accordance with the air speed of the aircraft, as during a landing operation, he merely moves the switch arm 90 so as to disengage contact 102 and engage contact 89 as shown in the dotted lines in Fig. 1. Under such conditions, the landing flaps 105 will be automatically controlled and the pilot need pay no further attention to them. As brought out in the detailed description, under these conditions, the landing flaps 105 will be moved downwardly to an extent depending upon the speed of the aircraft. If the pilot has reduced his speed to the normal landing speed, the control mechanism of the air speed responsive switch mechanism taken in conjunction with the action of spring 33 will permit the landing flaps to be moved to their full downward position, at which time limit switch 97 opens. If, on the other hand, the pilot is coming in too fast and it would be dangerous to have the landing flaps completely down, the air speed responsive mechanism in conjunction with the action of spring 33 will permit the landing flaps to be adjusted to a downward position entirely dependent upon and coextensive with the air speed. In other words, I have provided by the present invention an arrangement in which it might be said the landing flap position is modulated dependent upon the air speed so that the landing flaps can never be moved to a downward position greater than a safe position in respect to the then existing air speed of the aircraft. This modulating action is obtained as a result of the spring 33 connected to lever 30 and its adjustment by the motor armature 93 which at the same time adjusts the landing flaps. However, as explained above, whenever the pilot reduces his air speed to a proper value, the landing flaps will move to their full downward position so that full advantage of the landing flaps may be taken whenever the air speed is such that it is safe to do so. All of this is accomplished automatically without any attention upon the pilot's part after he has once placed the switch arm 90 in dotted line position so as to place the automatic control mechanism into operation. If, on the other hand, the pilot does not desire to use the landing flaps for any reason, and particularly during normal flight, they are maintained in their upward extreme position merely by the pilot placing the switch arm 90 in the full line position as shown in Fig. 1.

While I have shown and described a preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim as my invention:

1. A unitary condition responsive switch actuating device comprising, in combination, a first inverted U-shaped magnet, a first switch contact, a first switch arm for engaging said first switch contact for controlling the energization of said first magnet, said first switch arm pivotally mounted on one leg of said first inverted U- shaped magnet, first armature means actuated by the other leg of said first inverted U-shaped magnet upon energization of said first magnet so as to control the operation of the first switch arm, a second inverted U-shaped magnet, a second switch contact, a second switch arm for engaging said second switch contact for controlling the energization of said second magnet, said second switch arm pivotally mounted on one leg of said second inverted U-shaped magnet, second armature means actuated by the other leg of said second inverted U-shaped magnet upon energization of said second magnet so as to control the operation of the second switch arm, condition responsive means, and means for actuating the first and second switch arms controlled by the condition responsive means so as to cause said switch arms to disengage the first of said contacts and engage the second of said contacts upon a first condition and disengage the second of said contacts and engage the first of said contacts upon a second condition and disengage both of said first and second contacts upon a third condition.

2. A unitary condition responsive switch actuating device, comprising in combination, first switching means, first magnetic means the energization of which is controlled by the first switching means, first armature means operated by the first magnetic means so as to control the operation of the first switching means, second switch means, second magnetic means the energization of which is controlled by the second switching means, second armature means operated by the second magnetic means so as to control the operation of the second switching means, a first actuating member for operating the first of said switching means, a second actuating member for operating the second of said switching means, a lever interconnecting the said actuating members, a fixed pivot on which said lever is pivotally mounted, and separate condition responsive means operably connected to said lever at opposite sides of said pivot.

3. An aircraft automatic control device comprising, in combination, a first power flow control means, a second power flow control means, a fixed pivot, a lever pivotally mounted on said pivot, said first and second control means being operably connected to said lever at opposite sides of said pivot so as to be actuated by said lever, spaced condition responsive means operably connected to said lever at opposite sides of said pivot, independent biasing means operably connected at one end of said lever, and power means for adjusting said biasing means operated by said first and second power flow control means in such a manner as to vary the force exerted by said biasing means upon said lever so as to return said lever to a neutral position upon the actuation of said lever by said condition responsive means.

4. An aircraft automatic control device comprising, in combination, a first power flow control means, a second power flow control means, a pivoted lever, said first and second power flow control means being operably connected to said pivoted lever for actuation upon pivotal movement of said lever, condition responsive means for pivotally moving said lever, biasing means substantially continuously exerting a unidirectional biasing force upon said lever, and power means for adjusting said biasing means operated by said first and second power flow control means so as to adjust the magnitude of the force exerted by said biasing means in a manner to return said lever to a neutral position.

5. An aircraft automatic control means comprising, in combination, a first energy control means, a second energy control means, a pivoted lever, said first and second energy control means being operably connected to said pivoted lever for actuation thereby upon pivotal movement of said lever, airspeed responsive means for biasing said lever in a first direction, spring means biasing said lever in a second direction, reversible motor means controlled by said first and second energy control means, a flap member mounted on said aircraft positioned by said motor means in response to said first and second energy control means, and connections by which said motor means simultaneously adjusts said spring means so as to vary the biasing force exerted by said spring means upon said lever being biased from a first to a second position by said airspeed responsive means so as to cause the return of said lever from said second to said first position.

6. A unitary condition responsive switch actuating device comprising, in combination, first switching means, first magnetic means the energization of which is controlled by the first switching means, first armature means operated by the first magnetic means so as to control the operation of the first switching means, second switching means, second magnetic means the energization of which is controlled by the second switching means, second armature means operated by the second magnetic means so as to control the operation of the second switching means, a first actuating member for operating the first of said switching means, a second actuating member for operating the second of said switching means, a lever interconnecting the said actuating members, a fixed pivot on which said lever is pivotally mounted, first and second separate condition responsive means operably connected to said lever at opposite sides of said pivot, spring means for exerting a biasing force upon said lever, and adjustment means by which said biasing force may be varied so as to equalize the force exerted upon said lever by said condition responsive means.

7. A unitary condition responsive switch actuating device, comprising in combination, first switching means, first magnetic means the energization of which is controlled by the first switching means, first armature means operated by the first magnetic means so as to control the operation of the first switching means, second switching means, second magnetic means the energization of which is controlled by the second switching means, second armature means operated by the second magnetic means so as to control the operation of the second switching means, spaced condition responsive means for biasing the first and second switching means in a first sense, independent biasing means for biasing the first and second switching means in a second sense, and adjustment means by which the biasing force exerted by the independent biasing means may be varied for equalizing the biasing forces exerted by the condition responsive means and the independent biasing means.

8. An aircraft automatic control device comprising, in combination, a first switching means, a second switching means, a first actuating member for operating the first of said switching means, a second actuating member for operating the second of said switching means, a lever interconnecting the said actuating members, a fixed pivot for said lever, a dynamic atmospheric pressure responsive means operably connected to said lever at one side of said pivot and biasing said lever in a first direction, a static atmospheric pressure responsive means operably connected to said lever at the other side of said pivot and biasing said lever in a second direction, an independent spring tension means biasing said lever in said second direction, and adjustment means by which the tension exerted by said spring tension means may be varied so as to position said lever in a neutral position.

9. In a device of the character described comprising, in combination, a first energy control means, a second energy control means, a pivoted lever, said first and second energy control means being operably connected to said pivoted lever for actuation thereby upon pivotal movement of said lever, differential pressure responsive means for pivotally moving said lever in a first sense, unidirectional biasing means for pivotally moving said lever in a second and opposite sense, the first energy control means being actuated upon movement of said lever in said first sense and the second of said energy control means being actuated upon movement of said lever in said second sense, and means for adjusting the magnitude only of the tension of said biasing means.

10. In a device of the character described comprising, in combination, a first power flow control means, a second power flow control means, a pivoted lever, said first and second power flow control means being operably connected to said pivoted lever for actuation thereby upon pivotal movement of said lever, airspeed responsive means for pivotally moving said lever in a first sense, independent biasing means for pivotally moving said lever in a second sense, the first power flow control means being actuated upon movement of said lever in said first sense and the second of said power flow control means actuated upon movement of said lever in said second sense, means for adjusting the tension of said biasing means in such a manner as to position said lever in a neutral position, and power means responsive to said first and second power flow control means for regulating said adjustment means.

11. An aircraft control device of the character described comprising, in combination, first switching means, first magnetic means the energization of which is controlled by the first switching means, first armature means operated by the first magnetic means so as to control the operation of the first switching means, second switching means, second magnetic means the energization of which is controlled by the second switching means, second armature means operated by the second magnetic means so as to control the operation of the second switching means, a first actuating member for operating the first of said switching means, a second actuating member for operating the second of said switching means, a lever interconnecting the said actuating members, a fixed pivot for said lever, a dynamic atmospheric pressure responsive means operably connected to said lever at one side of said pivot and biasing said lever in a first direction, a static atmospheric pressure responsive means operably connected to said lever at the other side of said pivot and biasing said lever in a second direction, an independent spring tension means biasing said lever in said second direction, a rotatable cam for varying the tension exerted by said spring tension means so as to position said lever in a neutral position, motor means for rotating said cam and controlled by said first and second switching means, and a flap member mounted on said aircraft and adjustably positioned upon rotation of said cam by said motor means.

12. An aircraft control device of the character described comprising, in combination, first switching means, first magnetic means the energization of which is controlled by the first switching means, first armature means operated by the first magnetic means so as to control the operation of the first switching means, second switching means, second magnetic means the energization of which is controlled by the second switching means, second armature means operated by the second magnetic means so as to control the operation of the second switching means, a first actuating member for operating the first of said switching means, a second actuating member for operating the second of said switching means, a lever interconnecting the said actuating members, a fixed pivot for said lever, a dynamic atmospheric pressure responsive means operably connected to said lever at one side of said pivot and biasing said lever in a first direction, a static atmospheric pressure responsive means operably connected to said lever at the other side of said pivot and biasing said lever in a second direction, an independent spring tension means biasing said lever in said second direction, a rotatable cam for varying the tension exerted by said spring tension means to adjust said spring means so as to increase the tension exerted thereby upon rotation of said cam in one direction and decrease the tension of said spring means upon rotation of said cam in the opposite direction.

13. An automatic control means for an aircraft comprising, in combination, upwardly and downwardly adjustable landing flaps, a first electrical control switch, a second electrical control switch, a first actuating member for operating the first of said control switches, a second actuating member for operating the second of said control switches, a lever interconnecting the actuating members, a pivot for said lever, airspeed responsive means for biasing said lever in a direction for closing the second electrical control switch, independent biasing means for biasing said lever in an opposite direction for closing the first electrical control switch, adjustment means for varying the biasing force exerted by said independent biasing means, and motor means for adjusting said landing flap in a downwardly direction upon the closing of said first electrical control switch and for adjusting said landing flaps in an upwardly direction upon the closing of said second electrical control switch and for regulating said adjustment means so as to increase the biasing force exerted by said biasing means upon the upward adjustment of said landing flap and decrease the biasing force exerted by said biasing means upon the downward adjustment of said landing flap, whereby the airspeed at which said second electrical control switch may be closed and said first electrical control switch may be opened is progressively decreased as the landing flaps are moved downwardly to thereby limit the adjustment of said landing flap in response to airspeed conditions.

14. An automatic control means for an aircraft comprising in combination, an aircraft landing flap, a first control means, a second control means, a pivoted lever for actuating the first and second control means, airspeed responsive means for biasing said lever in a direction for actuating the second of said control means, independent biasing means for biasing said lever in an opposite direction for actuating the first of said control means, adjustment means for varying the biasing force exerted by said independent biasing means, and power means for adjusting said landing flap in a downwardly direction upon the actuation of said first control means and for adjusting said flap in an upwardly direction upon the actuation of said second control means and for regulating said adjustment means so as to increase the biasing force exerted by said biasing means upon the upward adjustment of said landing flap and decrease the biasing force exerted by said biasing means upon the downward adjustment of said landing flap, whereby the airspeed at which said second control means may be actuated is progressively decreased as the landing flap is moved downwardly and the airspeed at which said first control means may be actuated progressively increased as the landing flap is moved upwardly.

15. In control apparatus for an aircraft, flap means adjustable from a retracted position to any of a plurality of extended positions, actuating means for operating said flap means between said retracted and extended positions, differential pressure responsive means responsive to the airspeed of the aircraft and including a movable member, biasing means for urging said member in one direction, manual means for controlling said actuating means, means for connecting said differential pressure responsive means in controlling relation to said actuating means, and mechanical means for adjusting said biasing means in response to movement of said actuating means.

16. In control apparatus for an aircraft, flap means adjustable from a retracted position to any of a plurality of extended positions, a device including a movable member, means responsive to the airspeed of said aircraft for causing movement of said member, switch means operable by said member, manually operable switch means, spring means for biasing said member in one direction, motor means controlled by either of said switch means for adjusting said flaps, and mechanical means for adjusting said biasing means in response to movement of said motor means.

ALBERT E. BAAK.

REFERENCES CITED

The following references are of record in the file of this patent:

UNITED STATES PATENTS

| Number | Name | Date |
| --- | --- | --- |
| 1,921,172 | Taylor | Aug. 8, 1933 |
| 1,967,155 | Moller | July 17, 1934 |
| 2,026,728 | Barnhart | Jan. 7, 1936 |
| 2,169,982 | Manteuffel | Aug. 15, 1939 |
| 2,176,817 | Jacobson et al. | Oct. 17, 1939 |
| 2,191,250 | Fischel | Feb. 20, 1940 |
| 2,262,968 | Schmidt et al. | Nov. 18, 1941 |
| 2,269,068 | Corbin | Jan. 6, 1942 |
| 2,272,664 | Gropler | Feb. 10, 1942 |
| 2,279,615 | Bugatti | Apr. 14, 1942 |
| 2,288,843 | Roland | July 7, 1942 |
| 2,316,235 | Gast | Apr. 13, 1943 |